(12) United States Patent
Sahuguet

(10) Patent No.: US 8,844,800 B2
(45) Date of Patent: Sep. 30, 2014

(54) RATINGS USING MACHINE-READABLE REPRESENTATIONS

(75) Inventor: Arnaud Sahuguet, New York, NY (US)

(73) Assignee: Google Inc., Mountain View, CA (US)

( * ) Notice: Subject to any disclaimer, the term of this patent is extended or adjusted under 35 U.S.C. 154(b) by 382 days.

(21) Appl. No.: 12/060,188

(22) Filed: Mar. 31, 2008

(65) Prior Publication Data

US 2009/0242620 A1    Oct. 1, 2009

(51) Int. Cl.
| | |
|---|---|
| G06Q 30/00 | (2006.01) |
| G06Q 10/00 | (2006.01) |
| G06F 17/00 | (2006.01) |
| G06K 7/00 | (2006.01) |
| G06K 7/10 | (2006.01) |
| G06K 19/00 | (2006.01) |
| G06Q 30/02 | (2012.01) |
| G06F 17/30 | (2006.01) |

(52) U.S. Cl.
CPC ...... *G06F 17/30879* (2013.01); *G06Q 30/0278* (2013.01)
USPC ...... 235/375; 235/462.01; 235/435; 235/487; 705/14.4; 705/14.19; 705/7.32

(58) Field of Classification Search
USPC ............ 235/462.01, 435, 487, 375; 705/26.1, 705/10, 7.32, 14.44, 14.19, 14.4
See application file for complete search history.

(56) References Cited

U.S. PATENT DOCUMENTS

| | | | | | |
|---|---|---|---|---|---|
| 3,639,731 | A | * | 2/1972 | McNeill | 701/32.9 |
| 4,160,522 | A | * | 7/1979 | Dikinis | 235/454 |
| 4,293,766 | A | * | 10/1981 | Long et al. | 235/454 |
| 4,362,456 | A | * | 12/1982 | Barry | 414/334 |
| 4,864,306 | A | * | 9/1989 | Wiita | 342/42 |
| 4,937,439 | A | * | 6/1990 | Wanninger et al. | 235/456 |
| 5,159,180 | A | | 10/1992 | Feiler | |
| 5,293,310 | A | | 3/1994 | Carroll et al. | |
| 5,950,172 | A | * | 9/1999 | Klingman | 705/26 |
| 5,963,916 | A | | 10/1999 | Kaplan | |
| 5,978,774 | A | * | 11/1999 | Rogers et al. | 705/24 |
| 6,347,183 | B1 | | 2/2002 | Park | |
| 6,412,012 | B1 | | 6/2002 | Beiganski et al. | |
| 6,539,392 | B1 | * | 3/2003 | Rebane | 705/10 |

(Continued)

FOREIGN PATENT DOCUMENTS

| | | |
|---|---|---|
| EP | 1220113 A3 | 1/2004 |
| JP | 1166035 A | 3/1999 |

(Continued)

OTHER PUBLICATIONS

Amazon Video Reviews Nor Live, http://mashable.com/2007/11/12/amazon-video-reviews/ (Nov. 12, 2007), whole document.*

(Continued)

*Primary Examiner* — Daniel Walsh

(74) *Attorney, Agent, or Firm* — Fish & Richardson P.C.

(57) ABSTRACT

In a computer-implemented review method, a machine-readable representation that encodes an identification code associated with a ratable entity is decoded to obtain the identification code. The identification code is submitted to a central computer system, and a ratings form that can be used for providing a review of the ratable entity is received from the central computer system. A review of the ratable entity is provided to the central computer system using the review form.

29 Claims, 8 Drawing Sheets

(56) References Cited

U.S. PATENT DOCUMENTS

| | | |
|---|---|---|
| 6,641,037 B2 | 11/2003 | Williams |
| 6,800,029 B2 | 10/2004 | Rowe et al. |
| 6,938,002 B2 * | 8/2005 | Moskowitz et al. ............ 705/26 |
| 7,075,000 B2 | 7/2006 | Gang et al. |
| 7,258,266 B1 | 8/2007 | Bowe, Jr. et al. |
| 7,519,562 B1 * | 4/2009 | Vander Mey et al. ......... 705/500 |
| 7,624,952 B1 * | 12/2009 | Bartek .......................... 246/124 |
| 8,073,581 B2 * | 12/2011 | Morris et al. .................. 701/19 |
| 2001/0014868 A1 * | 8/2001 | Herz et al. ...................... 705/14 |
| 2002/0022992 A1 * | 2/2002 | Miller et al. .................... 705/14 |
| 2002/0022994 A1 * | 2/2002 | Miller et al. .................... 705/14 |
| 2002/0049607 A1 * | 4/2002 | Perkowski ........................ 705/1 |
| 2002/0082925 A1 * | 6/2002 | Herwig ............................ 705/16 |
| 2002/0132215 A1 * | 9/2002 | Casey-Cholakis et al. ... 434/350 |
| 2002/0134835 A1 * | 9/2002 | Kennedy ........................ 235/384 |
| 2002/0184041 A1 * | 12/2002 | Muller ............................... 705/1 |
| 2002/0198788 A1 * | 12/2002 | Moskowitz et al. ............ 705/26 |
| 2003/0187721 A1 * | 10/2003 | Etoh et al. ....................... 705/10 |
| 2003/0195800 A1 * | 10/2003 | Peters ............................. 705/14 |
| 2004/0059628 A1 * | 3/2004 | Parker et al. .................... 705/12 |
| 2004/0267597 A1 * | 12/2004 | Kobrosly et al. ............... 705/10 |
| 2005/0080815 A1 | 4/2005 | Inoue et al. |
| 2005/0267818 A1 | 12/2005 | Kaplan |
| 2006/0213987 A1 * | 9/2006 | Yukawa et al. ................ 235/383 |
| 2007/0022027 A1 | 1/2007 | Gupta et al. |
| 2008/0059607 A1 | 3/2008 | Schneider |
| 2009/0150920 A1 * | 6/2009 | Jones ............................. 725/23 |
| 2010/0131185 A1 * | 5/2010 | Morris et al. .................. 701/200 |
| 2010/0168940 A1 * | 7/2010 | King ............................... 701/20 |

FOREIGN PATENT DOCUMENTS

| | | |
|---|---|---|
| JP | 2001344502 A | 12/2001 |
| JP | 2002189928 A | 7/2002 |
| JP | 2005115843 A | 4/2005 |
| JP | 2006172172 A | 6/2006 |
| JP | 2006172332 A | 6/2006 |
| JP | 2006268763 A | 10/2006 |

OTHER PUBLICATIONS

International Searching Authority Authorized Officer Sang Cheol Kim, Patent Cooperation Treaty (PCT) International Search Report and Written Opinion for Application No. PCT/US2009/038779, dated Nov. 12, 2009, 11 pages.

Authorized Officer Nora Lindner, International Preliminary Report on Patentability for Application No. PCT/US2009/038779, dated Oct. 14, 2010, 6 pages.

Notice of Reasons for Rejection for Japanese Application No. 2011-503074, dated Jan. 28, 2014, 5 pages (with English translation).

Office Action in Australian Application No. 2009251647, dated Mar. 25, 2014, 3 pages.

Examination Reportl for Application No. 588346, dated Mar. 15, 2012, 2 pages.

Further Examination Report for Application No. 588346, dated Jun. 10, 2013, 2 pages.

Notice of Reasons for Rejection for Japanese Application No. 2011-503074, dated May 21, 2013, 13 pages.

Notification of the Second Office Action for Application No. 200980118731.3, dated Jul. 18, 2013, 19 pages.

Notification of the First Office Action for Application No. 200980118731.3, dated Sep. 5, 2012, 10 pages.

Supplementary European Search Report for Application No. 09755375.4, dated Jan. 7, 2013, 3 pages.

European Examination Report for Application No. 09755375.4, dated Jan. 29, 2013, 8 pages.

* cited by examiner

Lazy Lodge

We are glad that you enjoyed your stay at the Lazy Lodge.

This coupon entitles you to a 15% discount on your next visit.

See you soon!

FIG. 6A

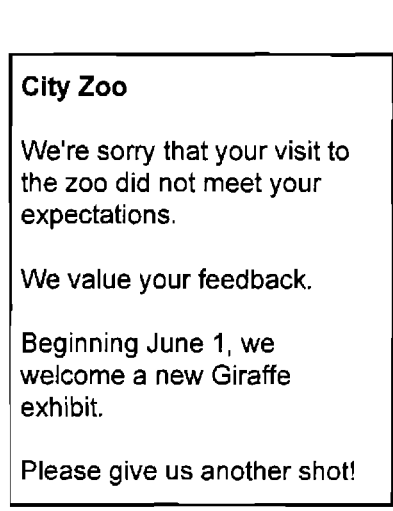

City Zoo

We're sorry that your visit to the zoo did not meet your expectations.

We value your feedback.

Beginning June 1, we welcome a new Giraffe exhibit.

Please give us another shot!

FIG. 6B

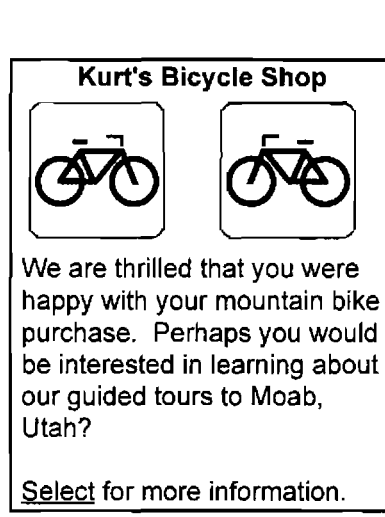

Kurt's Bicycle Shop

We are thrilled that you were happy with your mountain bike purchase. Perhaps you would be interested in learning about our guided tours to Moab, Utah?

Select for more information.

FIG. 6C

RATINGS USING MACHINE-READABLE REPRESENTATIONS

TECHNICAL FIELD

This document relates to using a machine-readable representation to rate a product or service.

BACKGROUND

Consumers today face a dizzying array of choices when in the market to purchase products or services. In some cases, a consumer may know exactly what he or she wants in advance when purchasing a product or service, but in other cases the consumer may have little knowledge of a given product or service subject area. In these cases, the consumer may wish to seek outside advice regarding potential products or services, such that he or she may make a wise purchasing decision. Frequently though, the consumer may not wish to conduct a lengthy research exercise in preparation for purchasing the product or service, as time is a valuable commodity and extensive research prior to purchasing can be tedious and may forestall acquisition of the product or service.

Historically, consumers have sought outside assistance with purchasing decisions in a number of ways. Word-of-mouth referrals have been and continue to be used. Magazines or newspapers that compare various products or services in a "shootout" format may discuss strengths and weaknesses of the products or services, and may pick a winning product or service deemed to be the best value or of the highest quality.

One way of compiling information and opinions concerning products and services is to collect user rankings of a product or service, compile the rankings, and present the rankings for comparison purposes to aid potential purchasers in their purchasing decisions. Examples of products or services that may be ranked to aid in future purchasing decisions might include: food quality, service and ambiance associated with a restaurant experience, level of enjoyment associated with viewing a particular movie, perhaps at a particular theater, a haircut or salon treatment, or a hamburger from a fast food restaurant. Rankings may be collected in a variety of ways. A user may rank a product or service by filling out a paper survey by hand and mailing the survey or ranking to a survey compiler. Alternatively, the user may receive a phone call requesting a ranking of the purchasing experience or of a purchased product/service some time after making the purchase, such as the following day or several days later, from a marketing group associated with the product or service.

A recent advance in the area of product and service information collection and presentation permits a user to rank a product or service online using a personal computer. After purchasing a product or service at a traditional retail store, for example, the user might drive home, connect to the Internet using a personal computer, access a ranking website, search, locate and select the relevant product or service, and enter a ranking or opinion regarding their experience in purchasing or using the product or service. However, even if a user has strong feelings concerning a product or service purchase immediately following the purchase and would like to enter a ranking of the experience, the user may forget to enter the ranking at the later time as other of life's demands vie for the user's attention and as memories of the experience degrade with the passage of time. Also, the user may later lack the time required to complete the ranking, or may consider logging on to the Internet and finding the ranking site and entering the ranking too inconvenient to warrant the effort.

SUMMARY

This document discloses systems and techniques to let consumers more conveniently provide or see reviews of items, such as products or services. The techniques may permit a user to capture, via a digital camera, a visible machine-readable representation, have that representation recognized as corresponding to a particular product or service, and then obtain or provide a review or other form of commenting on the product or service.

In one general implementation, a computer-implemented review method is disclosed. The method includes decoding a machine-readable representation that encodes an identification code associated with a ratable entity to obtain the identification code. The method also includes submitting the identification code to a central computer system, and receiving, from the central computer system, a ratings form that can be used for providing a review of the ratable entity. The method further includes providing a review of the ratable entity to the central computer system using the review form.

In various implementations, the ratable entity may be a product or service. Decoding the machine-readable representation may include capturing an image of the machine-readable representation with a digital camera and associating the image of the machine-readable representation with the identification code. The machine-readable representation may be a bar code or two-dimensional bar code. The method may further include receiving content from the central computer system after providing the review of the ratable entity, and the content may include a coupon received via electronic transmission or an promotional item for an entity that provides products or services similar to or complementary to those of the ratable entity. Providing a review of the ratable entity may include receiving user input ranking the ratable entity into the ratings form and providing the user input to the central computer system. The review may include multimedia content.

In another general implementation, a computer program product tangibly embodied and stored in an information carrier and includes instructions that when executed by a processor perform a method. The method includes decoding a machine-readable representation that encodes an identification code associated with a ratable entity to obtain the identification code. The method also includes submitting the identification code to a central computer system, and receiving, from the central computer system, a ratings form that can be used for providing a review of the ratable entity. The method further includes providing a review of the ratable entity to the central computer system using the review form.

In yet another general implementation, a computer-implemented review system includes a code generator to provide an identification code associated with a ratable entity, and a database storing a correlation between the identification code and one or more ratings categories submitted by a third party user in association with a request to provide the identification code. The system also includes a media server to transmit an electronic ratings form that include the one or more ratings categories in response to receipt of an identification code correlated in the database to the one or more ratable categories.

In yet another general implementation, a system includes a code generator to provide an identification code associated with a ratable entity, and a database storing a correlation between the identification code and one or more ratings categories submitted by a third party user in association with a request to provide the identification code. The system also includes means for associating a received identification code with one or more ratings categories and deliver an electronic ratings form that includes the one or more ratings categories for completion on a remote device from which the identification code is received.

In yet another general implementation, a computer-implemented method includes associating a ratable entity with an identification code and encoding the identification code in a machine-readable representation. The method also includes generating a ratings form for rating the ratable entity in response to receiving the identification code in an electronic communication from a mobile device and identifying the ratable entity using the received identification code. The method further includes providing the ratings form by electronic communication to the mobile device, and receiving by electronic communication a review of the ratable entity from the mobile device, the review comprising one or more ratings of the ratable entity.

The details of one or more embodiments are set forth in the accompanying drawings and the description below. Other features, objects, and advantages will be apparent from the description and drawings, and from the claims.

DESCRIPTION OF DRAWINGS

FIGS. 6a-6c are exemplary screen shots of content that may be presented on a display screen of a mobile device.

Like reference symbols in the various drawings indicate like elements.

DETAILED DESCRIPTION

Figure 1:
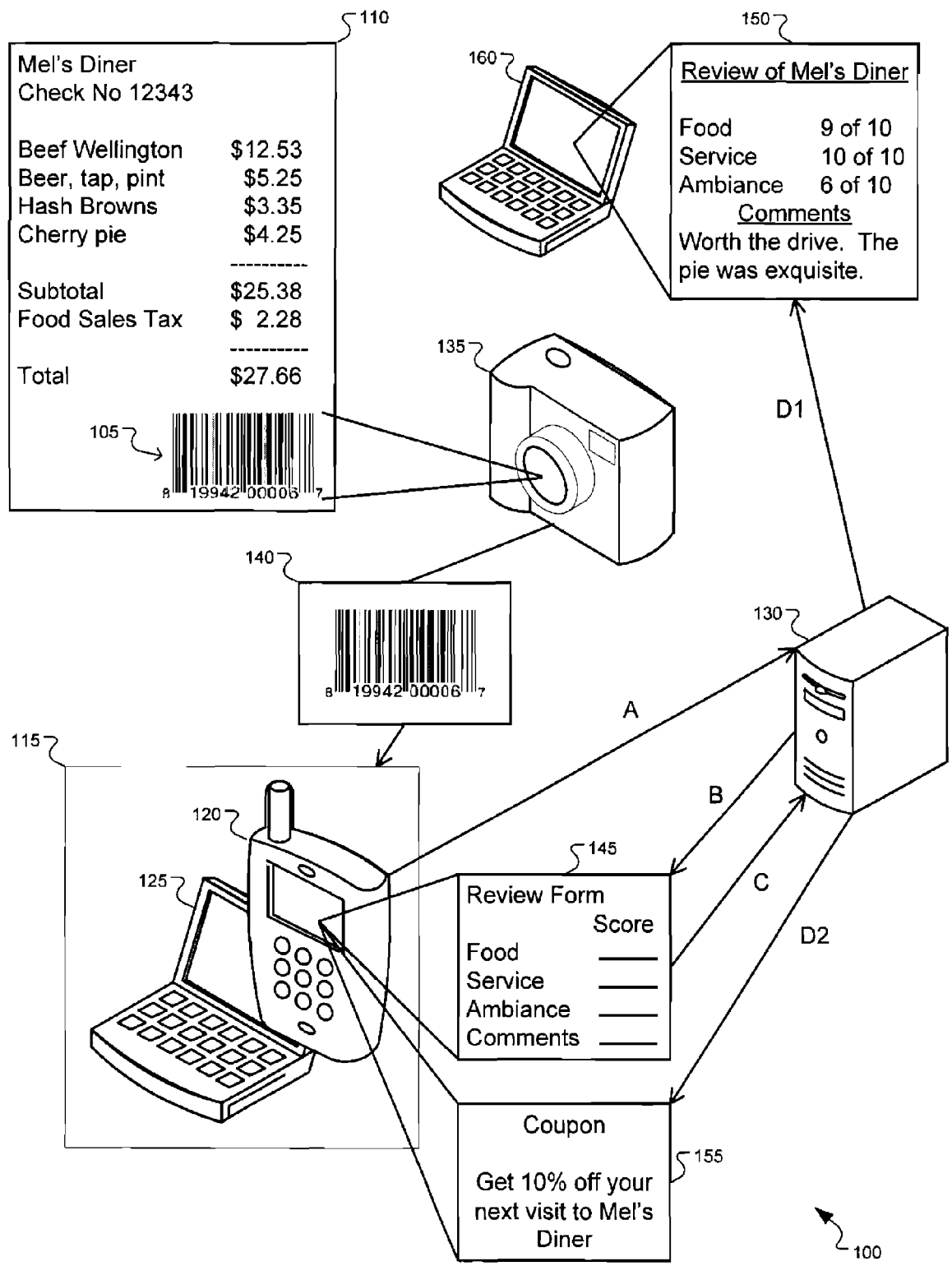
FIG. 1 is a diagram of an exemplary flow of information representing a customer rating a restaurant experience.

In an implementation, a user of a product or service may be provided with a machine-readable representation representing the product or service. For example, the user may receive a receipt that includes a machine-readable representation, such as a barcode or a two-dimensional barcode, that is associated with one or more purchased products or services. According to an implementation, a user may use a device equipped with a barcode reader to scan and decode the machine-readable representation. In other implementations, the user may use a handheld or mobile device that includes an integrated digital camera and decoding capability to decode an image of the machine-readable representation acquired by the digital camera. If the device includes communications capability for interfacing with a remote computer system, the user may use the device to transfer information relating to the machine-readable representation, the product or service, or some combination to the remote computer system, and may in return receive content from the remote computer system, according to some implementations. As used herein, the term "barcode" or "bar code" may refer to a one-dimensional barcode, a two-dimensional barcode, barcodes of higher dimension, or other machine-readable representation.

One example of such a device may be a cellular telephone equipped with a digital camera and software to decode the machine-readable representation. The machine-readable representation may alternatively include a human-readable representation that may be manually entered, for example by typing on a full or partial keyboard, into a device that may not function as a barcode reader. One example of such a representation is the numbers in a UPC symbol.

In an implementation, the handheld device may capture and decode an image of the machine-readable representation (e.g., barcode) into a computer representation. The device may then transmit the computer representation to a remote computer system, such as a server device. The handheld device may also transmit an image of the machine-readable representation. The handheld device may then receive a rating form from the server, upon which the user may enter a review of the corresponding product or service identified by the barcode. For example, the user may enter ratings into the form.

Reviews may include qualitative, quantitative, or multimedia content. Examples of reviews may include, but are not limited to, numbers or symbols within a certain range (e.g., "4 stars out of 5"), Boolean values (e.g., "I liked it," "I did not like it"), letter grades (e.g., A+, B, C−), or text (e.g., "The food was good, but the service was poor"). Reviews that include multimedia content may include a voice comment, a picture or photograph, or a short movie or video recording, or others. In some implementations, combinations of any of the above can be used. In some implementations, a user may submit a review that includes a recorded message, such as a message recorded with the user's mobile phone.

The user may also enter comments or suggestions, according to some implementations. When the user has fully or partially completed the rating form, the handheld device may transmit the ratings back to the server. In an implementation, the device receives an electronic communication from the server that includes the rating form, receives user input, incorporates the user input into the form, and returns the updated form to the server using an electronic communication.

The device may later receive content from the server related to the submitted ratings form, such as, for example, an electronic coupon, a thank you message or other type of message, an invitation to visit a web page containing information pertaining to the submitted ratings or other material, an advertisement for a related restaurant or other shop (e.g., gourmet grocery store), and the like. The server may aggregate the received ratings with other ratings, such as previously received ratings from other users, and may update a review web page or store the ratings in a database, among other possibilities. In this fashion, the user may conveniently rate an experience, product, or service at a convenient time while impressions of the experience or product or service may be fresh in the user's memory. Similarly, the user may receive useful or helpful content pertaining to the submitted rating, or to the associated experience, product or service.

FIG. 1 is a diagram 100 of an exemplary flow of information representing a customer rating a restaurant experience. In the illustrative example shown in FIG. 1, a customer has just finished a satisfying meal at Mel's Diner. Because the customer enjoyed the food, drink, and service associated with the dining experience, the customer would like to provide a favorable rating for Mel's Diner. Suppose, in this example, that the customer is a traveling salesperson, and that internet service is not presently available for her notebook computer, or that even if internet service is available, that the customer does not wish to unpack her notebook computer and connect to the Internet. The customer may nevertheless prefer to provide a rating while the experience is fresh in her memory, such as after finishing the meal or after paying the associated bill. For instance, the time between initial receipt of the bill and the waiter returning after charging the bill to a credit card may provide an opportune time for submitting the rating, as one example. The customer may further fear that she will forget to submit the rating if she postpones rating completion and submission until a later time, or that details of the experience will be forgotten or blurred with the passage of time.

Referring again to FIG. 1, the customer/user may be provided with a machine-readable representation 105 displayed on an object 110. In the example of FIG. 1, the machine-readable representation 105 is a barcode and appears on a receipt 110 for the meal at Mel's Diner, described above. In various implementations, machine-readable representations may be displayed on product packaging or directly on the products, on receipts for services or products, on a sign or display associated with a product, service, or establishment, or on various other objects. In various implementations, the barcode 105 may be a linear barcode or a two-dimensional barcode. Examples of linear barcodes include UPC symbols, EAN-13 codes, and pharmacodes. Examples of two dimensional barcodes include DataMatrix, QRCode, and PDF417 codes. In the example of FIG. 1, the barcode 105 is shown as a UPC symbol.

In an implementation, the barcode 105 may be entered into a computing device 115. Examples of computing devices 115 include, but are not limited to, a cellular telephone 120, a laptop computer 125, a personal digital assistant (PDA) and a Blackberry device. In some implementations, the computing device 115 may be a client device communicating with a server device 130, though a client-server relationship need not exist for communication between the device 115 and the server 130 to occur. The server 130 may be a remotely located computer or group of computers. In various implementations, an application executing on the server device 130 may be presented on the device 115, or vice versa.

Examples of entering a barcode 105 into a computing device 115 may include using a digital camera 135, such as a digital camera integrated within the computing device 115, to photograph (that is, capture a digital image of) the machine-readable representation 105, scanning the barcode 105 with a barcode scanner, and entering a human-readable representation of the barcode 105 into the computing device 115 through an input/output function. An image 140 of the barcode 105 is shown in FIG. 1, and may represent an image of a machine-readable representation 105 to be decoded by the handheld device 115. As another alternative, the user could use a separate digital camera 135, such as a web cam or other digital camera, to photograph the barcode. In this case, the image 140 may be transferred from the separate digital camera 135 to the computing device 115 (e.g., over a USB connection). Other possibilities include photographing (using a digital or analog/film camera) and printing an image of a machine-readable representation and scanning the image for transfer to the device 115 or server 130.

For clarity, the exemplary representation 100 of FIG. 1 depicts the camera 135 as a peripheral or standalone camera, but in many implementations the computing device 115 may include an integrated camera, such that a peripheral camera may be unnecessary. For example, the computing device 115 may be a camera-equipped mobile phone capable of capturing an image 140 of the barcode 105. While two examples 120, 125 of handheld computing devices 115 are shown in FIG. 1 to illustrate various options, a single device (such as a mobile phone, for example) may implement techniques described herein, such as capturing an image 140 of a representation 105, decoding the representation 105, and communicating with a remote computing device 130.

An application program running on the computing device 115 may decode the image 140 of the barcode 105 into an identification code, according to an implementation. The identification code may be a string of numeric or alphanumeric characters, a binary, octal or hexadecimal string, or some other representation, and may be stored in memory on the computing device 115 or transmitted to the server device 130. In other implementations, the device 115 may not decode the image 140 of the barcode 105, and may instead transmit the image 140 to another device, such as the server device 130, for decoding (e.g., in an MMS message).

In the present example, assume that the user is using a mobile phone 120 equipped with an integrated digital camera 135. The user may use the camera 135 to capture an image 140 of the barcode 105, which may be stored in memory in the cell phone 120. A program application running on the cell phone 120 may then decrypt the image 140 of the barcode 105 into an identification code. Alternatively, if the barcode 105 contains a human readable representation, the user may enter the identification code directly into the device 120, as by typing numbers in on the keypad. One example of a barcode 105 that contains a human readable representation is a UPC symbol. A UPC symbol may include a series of bars and a string of numbers below the bars, for example, that represent the identification code. In an implementation, the bars may encode the string of numbers. The identification code may be manually entered via an input form, according to some implementations.

The mobile device 120 may then transmit the identification code to the server 130, as shown by arrow A in FIG. 1. The transmission (A) may take one of several exemplary forms. For example, the identification code may be transmitted over the Internet or broadcast to a cellular tower. Other examples are possible, including combinations of the above. The mobile device 120 may also transmit a form of user identification to the server 130. The identification may include a cookie, the user's name, email address, and other identifying characteristics. In the example of FIG. 1, the cellular phone 120 may broadcast a message containing the identification code to a cellular tower. From there the message may be further transmitted over the Internet to the server 130.

The server 130 may receive the identification code. The server 130 may then match the identification code to a product, service, or venue, or other descriptor. In one implementation, the server 130 accesses the identification code in a database, and retrieves information that corresponds to the identification code using previously defined associations that are stored in the database. In another implementation, the server may query a web service for information. In yet another implementation, the identification code itself may contain the needed information. In some implementations, the server may generate content based on the received information. Other implementations are possible.

The server 130 may create a form 145 for entering ratings for the product, service, venue or descriptor. In one implementation, the server 130 may encode the form 145 in some suitable display format, such as HTML. Other display formats are possible. In another implementation, the server 130 may defer creation of the rating form 145 to the mobile device 120. In this case, the information about the product, service, or venue may be encoded in a different format, such as XML. Other formats may also be used. In an implementation, the server 130 may transmit the rating form 145 or information to the mobile device 120, as represented by arrow B in FIG. 1. Alternatively, the server 125 could embed the form 145 in an email to the user, or could store the form 145 and send the user a URL that links to the stored form in an email.

In other implementations, information about the product, service, venue or descriptor could be encoded directly into the barcode 105. This information could be decoded and used locally, at the device 120, to create a rating form 140 without transmitting or receiving anything from the server 130. For example, the mobile device 120 may have content or information stored locally within memory that can be accessed using decoded information derived from the captured machine-readable representation 105. In some implementations, the device 120 may store a subset of information stored at the server 130, for example.

Referring again to the restaurant rating example shown in FIG. 1, the server 130 may formulate a database query using the identification code, and may receive information from the database. The information returned from the database may contain the name of the establishment, Mel's Diner in this example. The information returned may also contain one or more ratable items. In the FIG. 1 example, the ratable items may include "Food," "Service," and "Ambiance." The server 130 may use this information to create the review form 145, which in this example includes an area for each category where the user may enter a score. Alternatively, the review form 145 may itself be retrieved from a database or memory of the server 130 or mobile device 120. In some implementations, the review form 145 may also contain a comment section where the user may enter comments in the form 145. The server 130 may then format an HTML rating form and transmit the form to the user's cell phone 120 (arrow B). In some implementations, the server 130 may transfer additional content or information to the mobile device, in addition to or in place of the ratings form 145.

The mobile device 120 may then receive the rating form 145 or other content or information from the server 130. In implementations where the mobile device 120 receives information about the product, service, venue or descriptor rather than the form 145 itself, the mobile device 120 may then create a rating form 145 from the information. The ratings form 145, whether received from the server 130 or locally generated, may be displayed to the user on a display screen of the device 120.

In an implementation, the steps described above may occur in a short period of time. For example, after finishing her meal, the user may be presented with the bill 110, which may include the barcode 105. The user may use the integrated digital camera in her cell phone to photograph the barcode 105, and then may leave a credit card or cash for the waiter to pay the bill, for example. Following capture of the barcode image, the barcode may be decoded (locally on the mobile phone 120 or at the server 130) to obtain an identification code. The identification code can be sent to the server 130, the server can generate a ratings form 145 and can send the ratings form 145 to the mobile device 120 for display. While waiting for the waiter to return with her credit card, for example, the user may advantageously complete the ratings form 145 while the experience is still fresh in her memory, and while she has a convenient opportunity to complete the form 145. The user may complete, partially complete, or ignore (perhaps choosing to complete later) the form 145, and can send the form 145 back to the server 130.

The mobile device 120 may transmit the completed or partially completed form back to the server 130, as shown by arrow C in FIG. 1, or to a different server. This transmission (arrow C) may be accomplished in similar fashion as the methods described above with respect to the first transmission.

In the example 100, the cell phone 120 may receive an HTML representation of the ratings form 145, and may display the form 145 on a display screen. The user may complete the ratings form 145, and may, for example, rate the food a score of "9," the service a score of "10," and the ambiance a score of "6." The user may also enter a comment, such as about a particular food item (e.g., pie). The cell phone 120 may then transmit the completed form 145 to the server 130 (arrow C).

The server 130 may receive this transmission from the mobile device 120, and may then process the completed ratings form. In one implementation, the ratings may be stored in a database. In another implementation, the server 130 may amalgamate the ratings with similar ratings. In some implementations, the server may maintain a web page 150 of ratings corresponding to the particular product, service, venue or descriptor. The web page may include a composite rating that includes feedback provide from several individual ratings, or may permit a user to access individual ratings, such as the rating 150 of Mel's Diner provided by the user in the FIG. 1 example. A user, curious about Mel's Diner, may access the rating 150 using a computing device 160. The server may transmit the rating 150 to the computing device 160, as represented by arrow D1 in FIG. 1.

In return for completing the review form 145, the server may provide content to the device 115 upon which the review was completed, as shown by arrow D2 in FIG. 1. For example, the server may provide a coupon 155, a thank you message, or other content to the handheld device 115. In the present example 100, the user receives an electronic coupon 155 through her cell phone 120 from the server 130 (as indicated by arrow D2).

Figure 2:
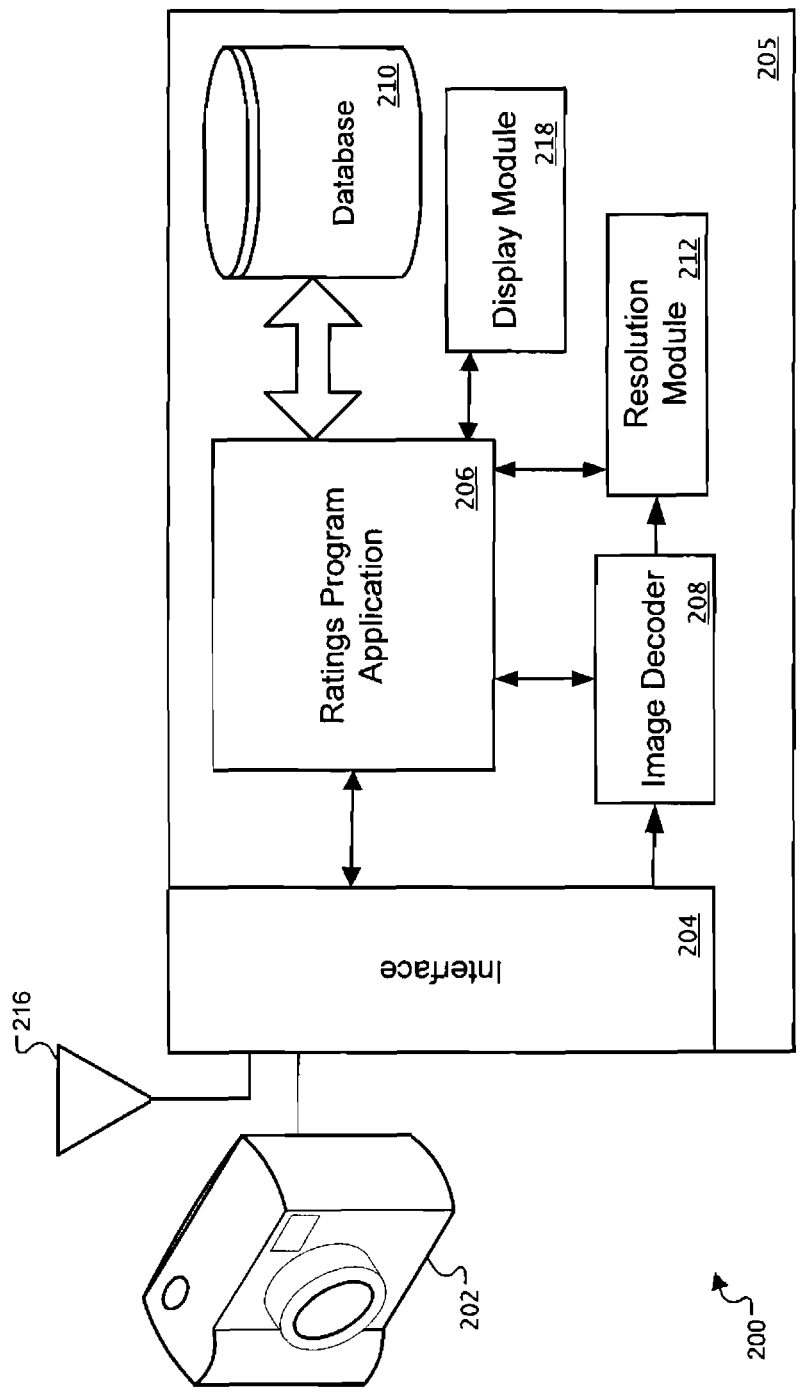
FIG. 2 is a block diagram of an exemplary handheld device that can be used to capture and decode an image of a machine-readable representation.

FIG. 2 is a block diagram 200 of an exemplary handheld device 205 that can be used to capture and decode an image of a machine-readable representation. In an implementation, the handheld device 205 is be a mobile phone. As described previously, the handheld device 205 may include a camera or other device (e.g., an IR scanner or an RF reader) capable of capturing a representation, as shown by capture device 202. For clarity, the capture device 202 is shown in FIG. 2 as a peripheral device connected to the handheld device 205 through an interface 204, but in some implementations the capture device 202 is integrated within the handheld device 205. According to an implementation, the handheld device 205 is a mobile phone that includes an integrated digital camera. In some implementations, other capture devices 202 can be used. Examples of other capture devices include, but are not limited to, a pen type scanner and a barcode scanner. In implementations where the capture device is not integrated within the handheld device 205, communication between devices may occur via wired or wireless communications means, including Bluetooth technology, for example.

The captured representation can be sent to an image decoder module 208 through the interface 204. The image decoder module 208 can decode the image of the machine-readable representation to obtain an identifier that can be used to identify an association between the representation and an associated product, service, venue, promotion, event, establishment, business, etc., or combination of the above. The image decoder 208 may decode the image of the captured representation to obtain a numeric identifier, according to an implementation, although other types of identifiers, such as alphanumeric identifiers, strings, ASCII values, and the like, may also be used.

In some implementations, the image decoder 208 may also be capable of decoding an IR scan, an RF signal, or some combination thereof. According to some implementations, the interface 204 can allow for abstraction between various capture mechanisms. For example, the image decoder 208 may receive representations from a camera, an IR scanner or an RF reader, as the interface 204 may be capable of generating like data from any of the capture mechanisms, which data the image decoder 208 may then use to decode the representation.

A ratings program application 206 may provide functionality associated with the machine-readable representations. The ratings application 206 may communicate with the interface 204, the image decoder 208, a display module 218, a storage database 210, and an optional resolution module 212. In an implementation, the ratings application 206 may receive the decoded identifier from the image decoder 208 and may transmit the identifier to a remote server over a network using a communications device 216. The communications device 216 may be devices in an internet connection, a cellular phone antenna, or other device. In this example, assume that the communications device 216 is a cellular phone antenna. As is conventional, the antenna 216 may be capable of sending and receiving information. The ratings application 206 may transmit and receive information through the interface 204 and the antenna 216. The information may pass through the network, to be described in more detail below with reference to FIG. 3.

Decoded identifiers can be sent from the ratings application 206 through the interface 204 over a network using antenna 216. Received information can include content associated with a transmitted identifier. Identifiers may be transmitted individually, and in some implementations, more than one identifier can be sent by the ratings application 206. For example, a user may capture more than one machine-readable representation, and the device 205 may transmit the associated identifiers together. For example, encoded identifiers, "_p~iF~ps|U," "_ulLnnqC" and "_mqNvxq'@" can be sent by the ratings application 206 as a single message "_p~iF~ps|U_ulLnnqC_mqNvxq'@," which can be transmitted to the server using antenna 216. Transmitting identifiers and receiving content is described in more detail in reference to FIG. 3.

The server may use the identifier to access content associated with the identifier and the associated product, service, venue, promotion, event, establishment or business, and may transmit the content to the mobile device 205, which may receive the content over a network through the antenna 216 and the interface 204. The ratings application 206 may then coordinate presentation of the content on the mobile device in concert with the display module 218, and may supplement the content with additional information, if appropriate. The display module 218 may provide the necessary control signals to a display screen of the mobile device to enable display of content and information. As is conventional, input may be received from, and information and content may be provided to, a user over various input/output components (not shown in FIG. 2) of the mobile device, such as a display screen, one or more indicator lights, speaker, keypad, touch screen, voice-activated input component, etc.

The ratings program application 206 can also access content associated with the identifier from a local data store, according to some implementations. For example, the ratings application 206 may use the decoded identifier to access the storage database 210, where content may be stored. The ratings application 206 can send the identifier to a storage unit (e.g., location database 210) so that the ratings application 206 can reuse captured representations by referencing the data store, as described above. Continuing the example, if the handheld device 205 were later used to capture one of the previously captured machine-readable representations, the ratings application 206 may retrieve stored content locally using the associated identifier, either in lieu of or in addition to transmitting the identifier or an image of the representation to the server 130.

In some implementations, the resolution module 212 may access the database 210 to determine the identifier (interface arrows omitted in FIG. 2 for clarity). In yet other implementations, the captured image may initially be passed through the ratings application 206, where various pre-processing steps may occur, and then to the image decoder 208 and perhaps also to the resolution module 212 for decoding. The resolution module 212 can receive the decoded representation and determine a rating identifier. In some implementations, the rating identifier can be a number (e.g., 128594), a string, an ASCII value (e.g., "_p~iF~ps|U"), or some combination thereof. In addition, the rating identifier may be encoded.

According to an implementation, the resolution module 212 may pass the decoded rating identifier to the ratings 206. In some implementations, functionality provided by the image decoder 208 and the resolution module 212 can be combined in a single module, and in some implementations the functionality provided by the resolution module 212 is not used at all. In various implementations, content, such as the ratings form 145, information used to generate the ratings form 145, or other content, may be accessible using the identifier produced by the image decoder module 208, while in other implementations the content may be accessible using the rating identifier produced by the resolution module 212.

Figure 3:
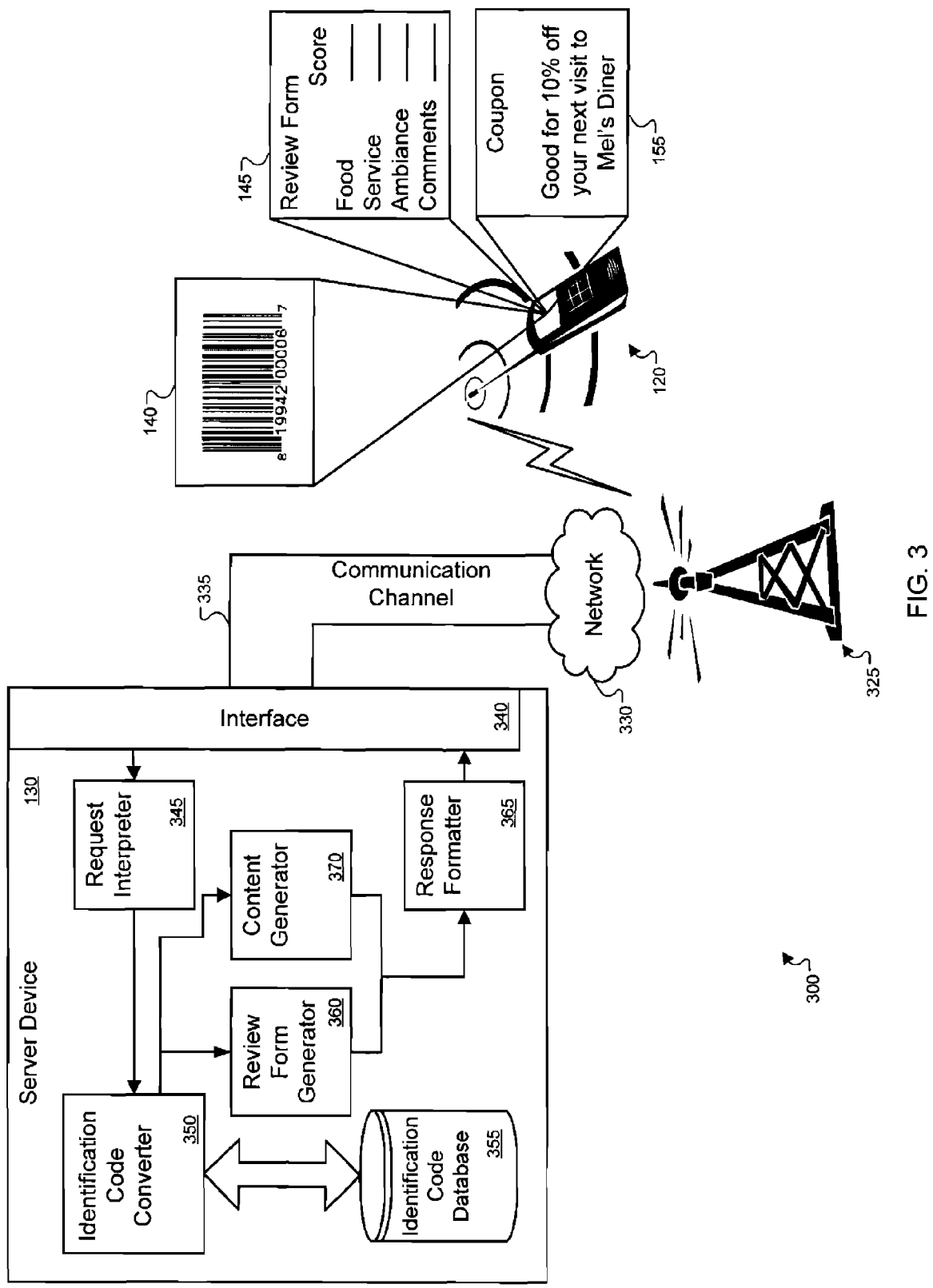
FIG. 3 is a block diagram of an exemplary system that can be used to provide content associated with an identification code.

FIG. 3 is a block diagram of an exemplary system 300 that can be used to provide content associated with an identification code. As described previously, a handheld device 120 can transmit an identifier to one or more server devices 130. In an implementation, the server 130 and the handheld device 120 can communicate over a network 330. For example, the handheld device 120 can transmit one or more identifiers to the server 130 over a network of wireless antennas, as illustrated by antenna 325 in FIG. 3. The server 130 can similarly transmit information related to the received identifier to the handheld device 120. The server 130 can use an illustratively shown communication channel 335 to send and receive information over the network 330. The communication channel 335 may permit communication over any number of ports. For example, the communication channel 335 can communicate over the same port that can be used for a Hypertext Transfer Protocol (HTTP) request.

The server 130 can receive and transmit information through an interface 340. For example, as described previously, the handheld device 120 can transmit identifiers over the network 330. The identifiers can be sent through the network 330 over communication channel 335 to the interface 340. In an implementation, the interface 340 may include a Common Gateway Interface (CGI).

The server 130 also includes a request interpreter module 345, a response formatter module 365, a content generator module 370, an identification code converter module 350, an identification code database 355, and a review form generator 360, according to an implementation. The request interpreter module 345 may receive and interpret information transmissions received from the interface 340, such as transmissions received over the network 330. The request interpreter 345 can parse the information to generate a request that the other server modules can understand. For example, the request interpreter can generate a "Find _p~iF~ps|U" message and send the message to the identification code converter module 350.

In an implementation, the code converter 350 can receive messages from the request interpreter module 345 and access content related to an identification code included in the received message. The code converter 350 can access content or information in a number of ways. For example, it may use a received identifier to access a database, or may convert a received identifier to an associated entity, such as a descriptor that identifies a product, service, event, promotion, business, enterprise, location, etc. In an implementation, the descriptor may then be used to access the database and retrieve related content. In the present example, the descriptor or the identifier can be used to access a data store, such as database 355, and retrieve related information, according to some implementations. The identification code converter 350 may format a query to access the identification code database 355 using the identification code, and receive information from the database 355. For instance, the code converter 350 can use the identifier to access a correlation stored in the database 355 that identifies an association between the identifier and an associated identity, such as a product, service, venue, business, establishment, event, promotion, etc. As another example, the code converter 350 can parse an identifier (e.g., "_p~iF~ps|U") into its corresponding entity (e.g., a dining experience at Mel's Diner). It can then access the code location database 355 to retrieve information related to the entity. The code converter 350 can send the converted identifier and any stored data from the code location database 355 to the review form generator 360 or the content generator module 370.

The review form generator 360 and content generator module 370 can operate in similar fashion to provide content for the handheld device 120. For example, each may receive information related to one or more entities from the code converter 350, and may generate content that can be displayed by the handheld device 120. For example, the review form generator 370 can receive a string from the code converter 350 that includes "Food; Service; Ambiance; Comments." The review form generator 360 can use the string to generate a Hypertext Markup Language (HTML) page that includes a ratings form 145 with ratings categories for food, service and ambiance, and which accepts comments, according to an implementation. Similarly, the content generator can receive information and use it to generate a page that includes a coupon, a message, a request, a recommendation, a notification or a reminder, to list a few examples. In various implementations, the review form generator 360 or content generator 370 may access the database 355 (for clarity, interface arrows not shown in FIG. 3).

In some implementations, the generated content is a set of machine-readable instructions that when executed perform an action on the handheld device 120. For example, the same string "Food; Service; Ambiance; Comments" can be coded into machine-readable instructions that when executed modify the behavior of the ratings application 206 being executed by the handheld device 205. The modified behavior can include populating a portion of the user interface with information, invoking another application, and the like. The review form generator 360 or content generator module 370 can then send the generated content to the response formatter 320.

The response formatter 365 can receive content generated by the review form generator 360 or the content generator module 370 and prepare the content for transport over the network 330. For instance, the response formatter 320 may generate a message that includes the aforementioned content to be sent over the network 330 to the handheld device 120. As one illustrative example, if the review form generator 360 generates an HTML page, the response formatter 365 may include the HTML page in an HTTP response. The response formatter 365 can send generated responses to the interface 340.

The interface 340 can send messages generated by the response formatter 365 to the handheld device 120 over the network 330 using communication channel 335. For example, the interface can send the HTTP request through the communication channel 335 to the network 330 using an appropriate port. The response formatter 365 may also send content to a different remote device, such as client device 160 (see FIG. 1).

The handheld device 120 can then display the content contained in the response by displaying an HTML page, or by executing machine-readable instructions, for example. The handheld device 120 may host a browser application, which may be used to display content received from the server 130. As illustrated by FIG. 3, content for display on the handheld device 120 may include a ratings form 145 or a coupon 155, to list just a couple of examples. In various implementations, users may redeem such coupons in a variety of ways, such as by showing the coupon message to an employee of the corresponding business or by using the mobile device 120 to transmit an electronic message to a receiving device at the corresponding business. In alternative implementations, the coupon may be a rebate that may be later redeemed. Other content examples may include an advertisement, such as an advertisement of a promotion that Mel's Diner is offering, or an advertisement from another business. In some implementations, the advertisement may be from a business located nearby the location of the business associated with the machine-readable representation, such as a business across the street from Mel's Diner in this example.

In some implementations, the server interface 340 can include the request interpreter 345 and the response formatter 365. In general, the request interpreter 345 and the response formatter 365 in such an implementation would behave in a similar fashion as described above. However, because the three modules 340, 345, and 365 would be integrated in this case, certain message-passing and object-handling details may differ. For example, instead of creating an object and sending it to the request interpreter module, the interface 340 may instead execute machine-readable instructions (e.g., assembly code) that perform the request interpreter functionality.

It will be understood that the handheld device modules shown in FIG. 2 and the server modules shown in FIG. 3 may be combined or further separated in any number of ways. Further, the techniques disclosed herein may be implemented in hardware or software modules, or a combination or both. Functionality described as occurring at the server 130 may alternatively occur on the handheld device 120, or vice versa, in some implementations. FIG. 3 shows a single server device 130, but in some implementations more than one server may be used to implement the techniques described herein. Databases or mass storage units may be peripheral to the server 130 or the handheld device 120 in some implementations.

Figure 4:
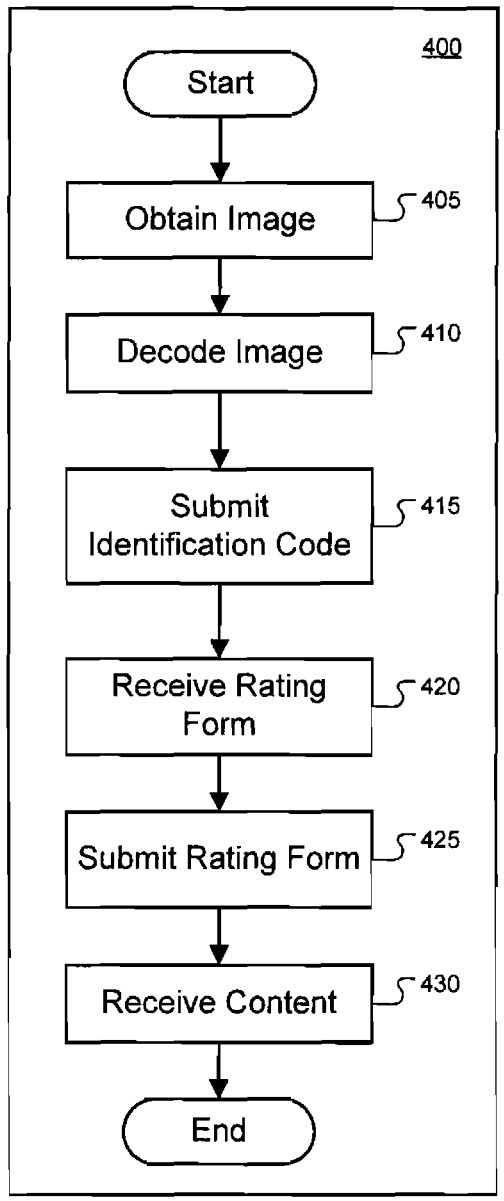
FIG. 4 is a flowchart of an exemplary method that a device may perform to submit a rating using a machine-readable representation.

FIG. 4 is a flowchart 400 of an exemplary method that a device may perform to submit a rating using a machine-readable representation. In an implementation, the device may be a mobile device such as a mobile phone, a PDA, or a laptop or notepad computer. A process begins at step 405 when the device obtains an image of a machine-readable representation. The representation may be associated with a product, service, promotion, event, location, business, experience, establishment, etc., collectively referred to hereafter as a ratable entity. The image may be obtained in many ways. In one implementation the image may be captured by a digital camera, such as a camera integrated within a mobile phone or a PDA. In another implementation the image may be scanned by a barcode reader. The machine-readable representation may be a barcode, according to an implementation.

At step 410, the device may decode the image to obtain an identification code or identifier that represents the ratable entity. At step 415, the client device 115 may submit the identification code associated with the decoded image to a central computer system, such as the server 130 of FIG. 1. In a some implementations, step 410 may be omitted and the device may submit the image to the central computer system 130 for remote decode.

Next, at step 420, the mobile device may receive, from the central computer system 130, a rating form, such as form 145 (FIG. 1), that may be used for rating the ratable entity. According to an implementation, the server may generate the rating form in response to receiving a request from the device, which request may include the identification code, the image, or both. In alternative implementations, the device may receive instructions from the server, and may use the instructions to create the form. In yet other alternative implementations, the mobile device may receive partial instructions for creating the form, and may access additional instructions for creating the form that may be stored on the locally on the device. In some implementations, step 415 may be omitted and the device may use the identification code to create the ratings form for rating the ratable entity, perhaps accessing content stored locally at the device, such as in the device database 210 (see FIG. 2).

At step 425, the mobile device may submit the rating from to the central computer system 130. In various implementations, the submitted rating form may be completed, partially completed, for example by receiving and incorporating input regarding the ratings from a user, or may be unedited. In various implementations, the form may contain numbers (e.g. 1-10) representing the ratings, multiple-choice answers to questions posed by the form, letter grade rankings, comments, symbol rankings within a range, among other possibilities. In an implementation, the form may specify the rating method preferred, while in other implementations style instructions may not be provided. In either case, the server or the device may be capable of receiving ratings in a variety of formats, including the examples listed above, and may be able to translate between formats, according to some implementations. In this manner, device display space may be conserved to maximize presentation potential, and flexibility may be enhanced as a variety of feedback formats may be seamlessly supported. In one exemplary implementation, the rating form may be provided to the central computer system 130. In a different implementation, the ratings may be extracted from the form and provided to the central computer system 130 without transmitting some or all of the information received from the server, which may conserve bandwidth.

At step 430, the device may receive content from the central computer system according to an implementation. This content may be provided in response to receipt of a completed or partially completed ratings form, and may include a coupon, a thank you message, an advertisement, a promotion, a reminder, a recommendation, an acknowledgement, a URL to a web page, or some other type of message. In other implementations, additional computing devices may also receive information from the server. For example, with reference to FIG. 1, device 160 may receive an email with information that a review has been received or that a ranking has been updated, perhaps including a URL link to a web page, for example. A user of device 160 may have selected to receive email updates related to rankings of the ratable entity, according to some implementations. In some implementations, step 430 may be omitted, and the device may not receive content from the server.

Figure 5:
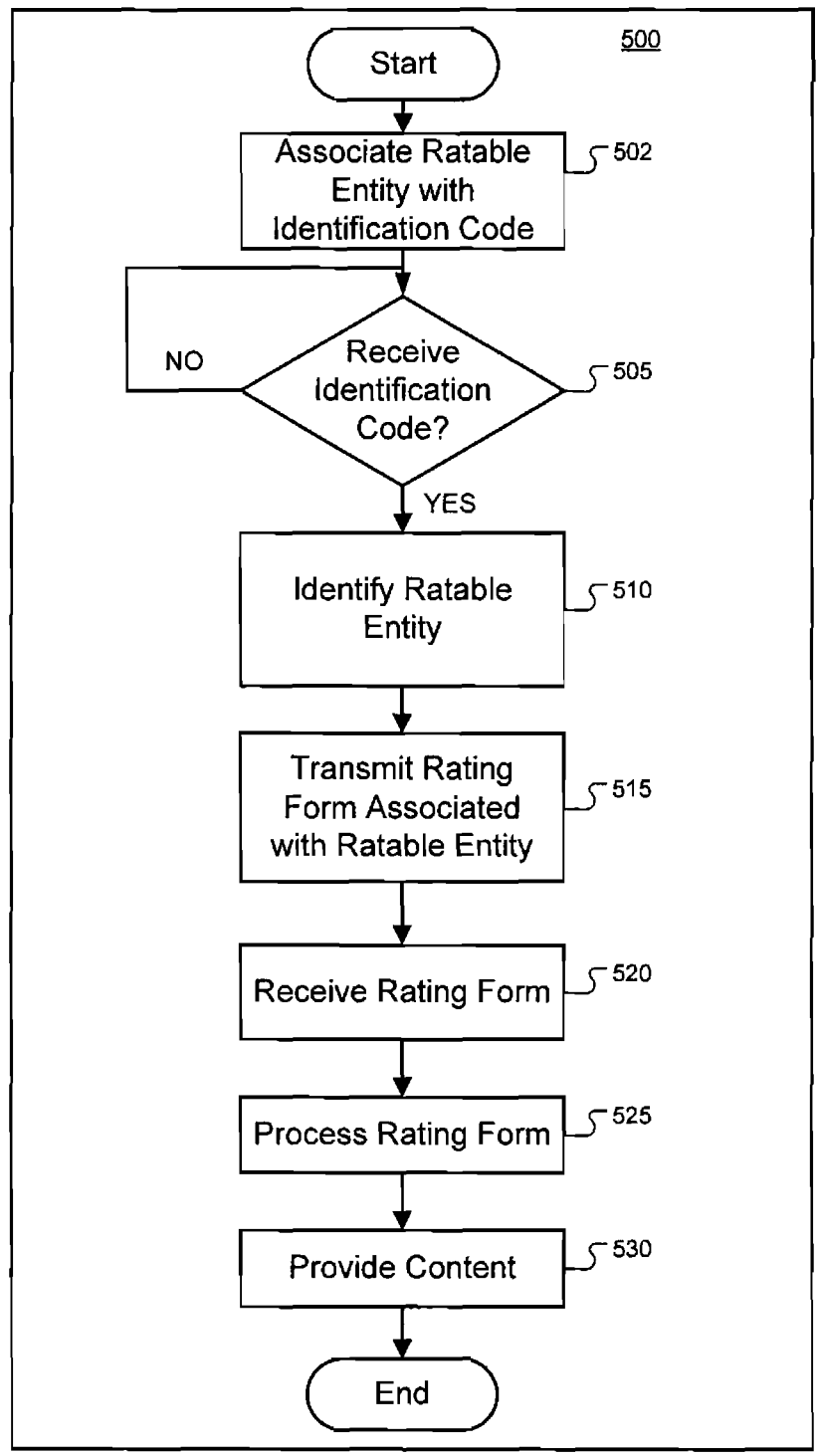
FIG. 5 is a flowchart of an exemplary method that a computer system may perform to manage a ratings system for ratable entities.

FIG. 5 is a flowchart 500 of an exemplary method that a computer system may perform to manage a ratings system for ratable entities. In some implementations the computer system is a server device, such as server 130 (FIG. 3), while in other implementations the computer system is a mobile device, such as device 203 (FIG. 2). It will be assumed in the discussion that follows that the computing system is a server device, such as server 130. A process beings at step 502 with associating a ratable entity with an identification code. The ratable entity may be, among other possibilities, a product, service, promotion, event, location, business, experience, or establishment. According to an implementation, a request for such an association may be received from a third-party user. The identification code may then be encoded in a machine-readable representation, such as a bar code, and may be provided or made available to the third party user. The third party user may present the machine-readable representation in association with the ratable entity, such that customers or users may use the machine-readable representation to provide a review of the ratable entity, as described more fully below. At step 505, the process waits for receipt of an identification code. Receiving the identification code may include, but is not limited to, receiving an internet transmission containing the identification code, receiving a cellular phone transmission containing the identification code, and receiving a transmission containing the identification code through the communications channel 335. The identification code, or identifier, may have been decoded by a decoding module on a mobile device, according to an implementation. In an alternative implementation, the identification code is identified based on an association with an identifier encoded in a machine-readable representation, the identification code itself not directly encoded in the representation.

Following receipt of an identification code, at step 510 the ratable entity is identified using the identification code. In an implementation, identifying the ratable entity may include formatting a database query, submitting the query to a database, and receiving information about the ratable entity from the database. In another implementation, identifying the ratable entity may include formatting a web service query, submitting the query to a web service, and receiving information about the ratable entity from the web service. In yet another implementation, identifying the ratable entity may include decoding the identification code and extracting information about the ratable entity from the identification code. Other implementations are possible.

A review form or ratings form that can be used to rate the ratable entity may be generated using the identification code, the ratable entity, or both. Generation of the ratings form may include accessing content from a database, according to an implementation. The central computer system may encode the ratings form in a suitable display format, such as HTML. Other display formats are possible. In another implementation, the central computer system may create a partial review form, and may defer the final creation of the form to the mobile device. In this implementation, the central computer system may encode the form in a suitable data format, such as XML. Other data formats are possible.

At step 515, the central computer system may transmit the rating form associated with the ratable entity to the mobile device. Transmitting the form may include sending an internet transmission containing the form, sending a cellular phone transmission containing the form, and sending the form through communications channel 335. Alternatively, the central computer system may embed the form in an email to the user, or may store the form at the server end and send the user a URL that links to the stored form.

The computer system may receive the ratings form from the mobile device at step 520, for example after a user has edited the form on the mobile device. The ratings form may be completed or partially completed, or in some cases returned unedited. In alternative implementations, ratings or rankings may be extracted from the review form by the mobile device, and the computer system may receive a transmission that includes the rankings but not the balance of the form. In this implementation the extracted ratings may be encoded in a suitable format, such as the GET section of a URL string. Another format for encoding the ratings may be an extensible data format, such as XML. Other formats are possible.

At step 525, the computer system processes the rating form. Processing the form may include extracting the ratings from the form, according to an implementation. In an implementation where the ratings are extracted by the mobile device and encoded in a suitable data format, processing the form may include decoding the data format to obtain the ratings. Processing the form 145 may also include formatting a database query to store the ratings in a database, and executing the query against the database. In another implementation, the computer system 130 may amalgamate the ratings with similar ratings, perhaps updating a comprehensive rating of the ratable entity based on the newly received ratings or rankings. In some implementations, processing the rating form may include translating the ratings from one ratings format to another, such as from a number grade to a letter grade, to list just one example.

At step 530, the computer system may provide content to the mobile device, according to an implementation. The content or information can be supplied via electronic transmission, and can take various forms. The content may include a coupon, an acknowledgement, a message, a reminder, an email message, a URL link to a web page, an audio file, a video file, an image, or various combinations of the above. In one implementation, the content may be provided as a reward for filling out the ranking form. The computer system may embed the content in an email and send the email to the user. The computer system may store the content locally and send an email that includes a URL that links to the stored content. In some implementations, the computer system may maintain a web page, such as the web page 150 shown in FIG. 1, of ratings corresponding to the particular ratable entity. The web page may include a composite rating that includes feedback from several individual ratings, or may permit a user to access individual ratings, such as the rating of Mel's Diner provided by the user in the example of FIG. 1. The web page may be sent to the mobile device or to a different computing device.

FIGS. 6a-6c are exemplary screen shots 600, 605, 610 of content that may be presented on a display screen of a mobile device. According to some implementations, the screen shots 600, 605, or 610 may be displayed on the mobile device after receiving the content or information from the server, which may occur after submitting a completed ratings form. In other implementations, the mobile device may supply the content or a portion of the content. FIG. 6a is an exemplary screen shot 600 of a message responding to a favorable review for a vacation experience, and includes a coupon that provides a discount on a future stay. In an implementation, an audio file may be included in the content that enables a theme song to be played on a speaker of the device, for example, while the visual content is displayed on a display screen. FIG. 6b is an exemplary screen shot 605 of a response to a disappointing rating. FIG. 6c is an exemplary screen shot 610 of a response to a favorable review. The screen shot 610 includes images and a link that may be selected by a user to link to a web page, for example.

Figure 7:
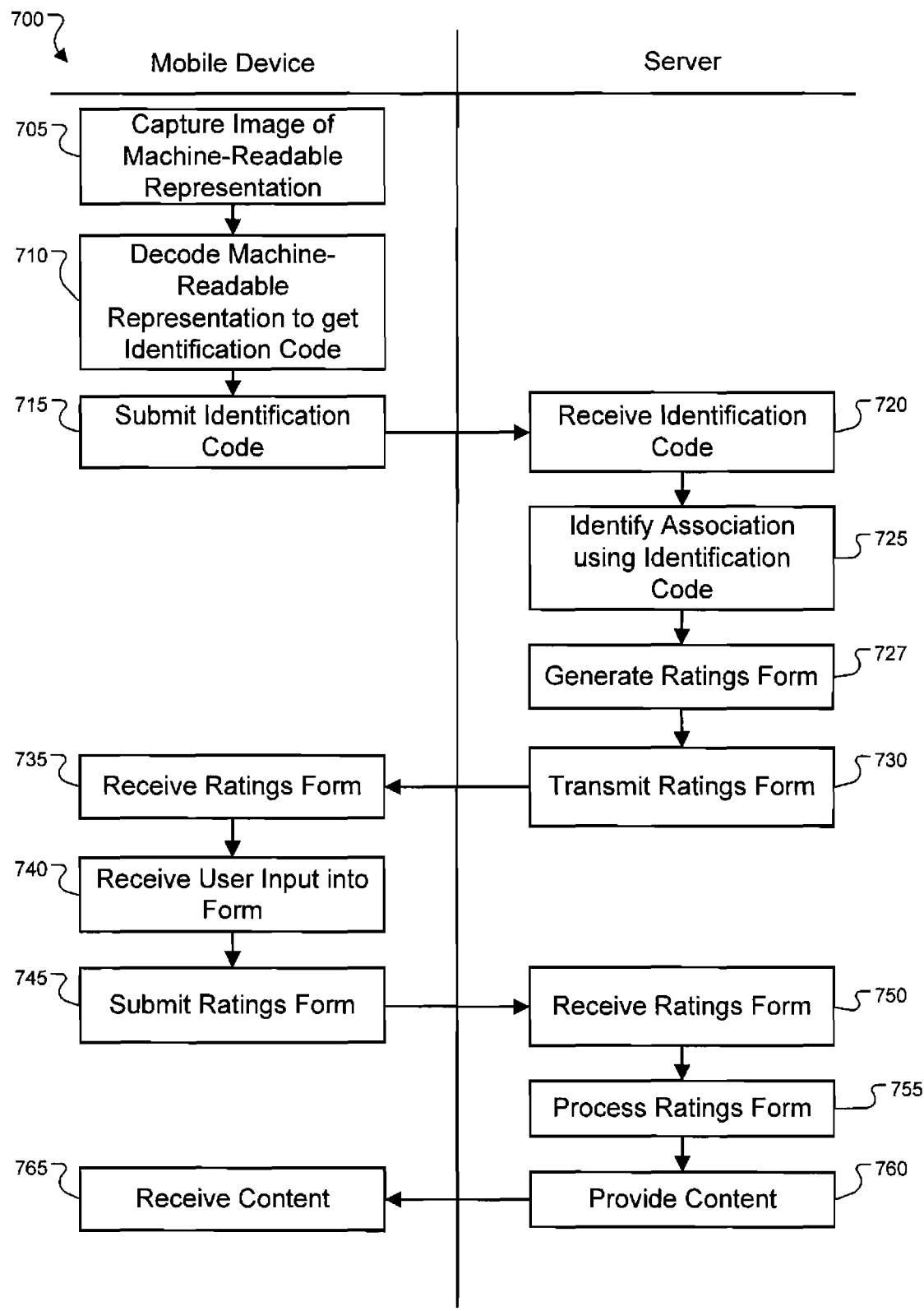
FIG. 7 is a flow chart of exemplary actions by a mobile device and a server in a system that can be used for providing ratings using machine-readable representations.

FIG. 7 is a flow chart 700 of exemplary actions by a mobile device and a server in a system that can be used for providing ratings using machine-readable representations. In an implementation, the mobile device may be a mobile phone, a PDA, or a laptop computer, such as the devices 120, 125 shown in FIG. 1, and the server may be a central computing system such as server 130. At step 705, the mobile device may capture an image of a machine-readable representation. The machine-readable representation may be a barcode, a two-dimensional barcode, a UPC symbol, or any other machine-readable representation that encodes information. In one implementation, the image may be captured by a digital camera 135; in another implementation the image may be scanned by a barcode reader.

At step 710, the mobile device may decode the machine readable representation by decoding the image of the machine-readable representation to obtain an identification code. The identification code may be associated with a ratable entity, according to an implementation. At step 715, the mobile device may submit the identification code to the server, and the server may receive the identification code at step 720. Receiving the identification code may include, but is not limited to, receiving an internet transmission containing the identification code, receiving a cellular phone transmission containing the identification code, or receiving a transmission containing the identification code through the communications channel 335.

At step 725, the server may identify an association using the identification code. In an implementation, the association may define a correlation between the identification code and a ratable entity. The ratable entity, as described above, may correspond to anything that may be rated or ranked, such as items, services, or consumables that a purchaser may purchase, or to corresponding businesses or establishments that sell such items, services or consumables. In one implementation, identifying the ratable entity may include formatting a database query, submitting it to an database, and receiving information about the ratable entity. In some implementations, the query may return an identifier that identifies the ratable entity, information associated with the ratable entity, or a combination of the above. Additional database queries may be executed. In another implementation, the identification may include formatting a web service query, submitting it to an identification code web service, and receiving information about the ratable entity. In yet another implementation, the identification may include decoding the identification code and extracting information about the ratable entity from the identification code. In the implementation where the mobile device submits the image, rather than the identification code, the server may decode the image to obtain the identification code. Other implementations are possible.

A ratings form may be generated at step 727. The ratings form may be used to rate the ratable entity, according to an implementation, and may be generated by retrieving information associated with the ratable entity or the identification code from a storage location and generating the form using the retrieved information. In some implementations, the ratings form may have been previously generated and stored in a storage location, in which case it may be retrieved at step 727. The server may format the ratings form, or may format instructions for creating the form.

At step 730, the server may transmit the ratings form to the mobile device, and the mobile device may receive the form at step 735. Transmitting the form may include sending an internet transmission containing the form, sending a cellular phone transmission containing the form, and sending the form through communications channel 335. Alternatively, the server may embed the form in an email to the user, or may store the form and send the user a URL that links to the stored form in an email. In an implementation, the mobile device may receive the ratings form in its entirety. In another implementation, the mobile device may receive instructions for creating the form, and may create the form from the instructions.

At step 740, the mobile device may receive user input and use it to populate the ratings form. In an implementation, the received user input includes one or more ratings of one or more ratable entities. In this fashion, the ratings form may be completed, or partially completed. At step 745, the mobile device may submit the populated ratings form to the server, and the server may receive the ratings form at step 750. In an alternative implementation, the ratings may be extracted from the ratings form and provided to the server.

At step 755, the server may process the received ratings form or separate ratings. Processing the form may include extracting the ratings from the form. In an implementation where the mobile device encodes the ratings or the form in a suitable data format, the processing may include decoding the data format to obtain the ratings. The processing may also include formatting a database query to store the ratings in a database, and executing the query against the database. In another implementation, the server may amalgamate the ratings with similar ratings, and may update comprehensive ratings or one or more web pages or storage locations.

At step 760, the server may provide content to the mobile device, and the mobile device may receive the content at step 765. In some implementations the server may format a coupon, thank you message or other message for transmission to the mobile device. The server may embed the coupon, thank you message, or other message in an email and send the email to the user. The server may save the coupon, thank you message, or other message and send a URL to the saved content in an email to the user. In some implementations, the server may maintain a web page, such as page 150 (FIG. 1), of ratings corresponding to the ratable entity. The web page may include a composite rating that includes feedback provide from several individual ratings, or may permit a user to access individual ratings, such as the rating 150 of Mel's Diner provided by the user in the FIG. 1. The web page may be sent to the mobile device or to a different computing device. One example of more than one computing devices receiving content from the server is shown in FIG. 1, where the mobile device 115 and additional computing device 160 each receive content from the server 130. In other implementations, content may not be sent by the server.

Figure 8:
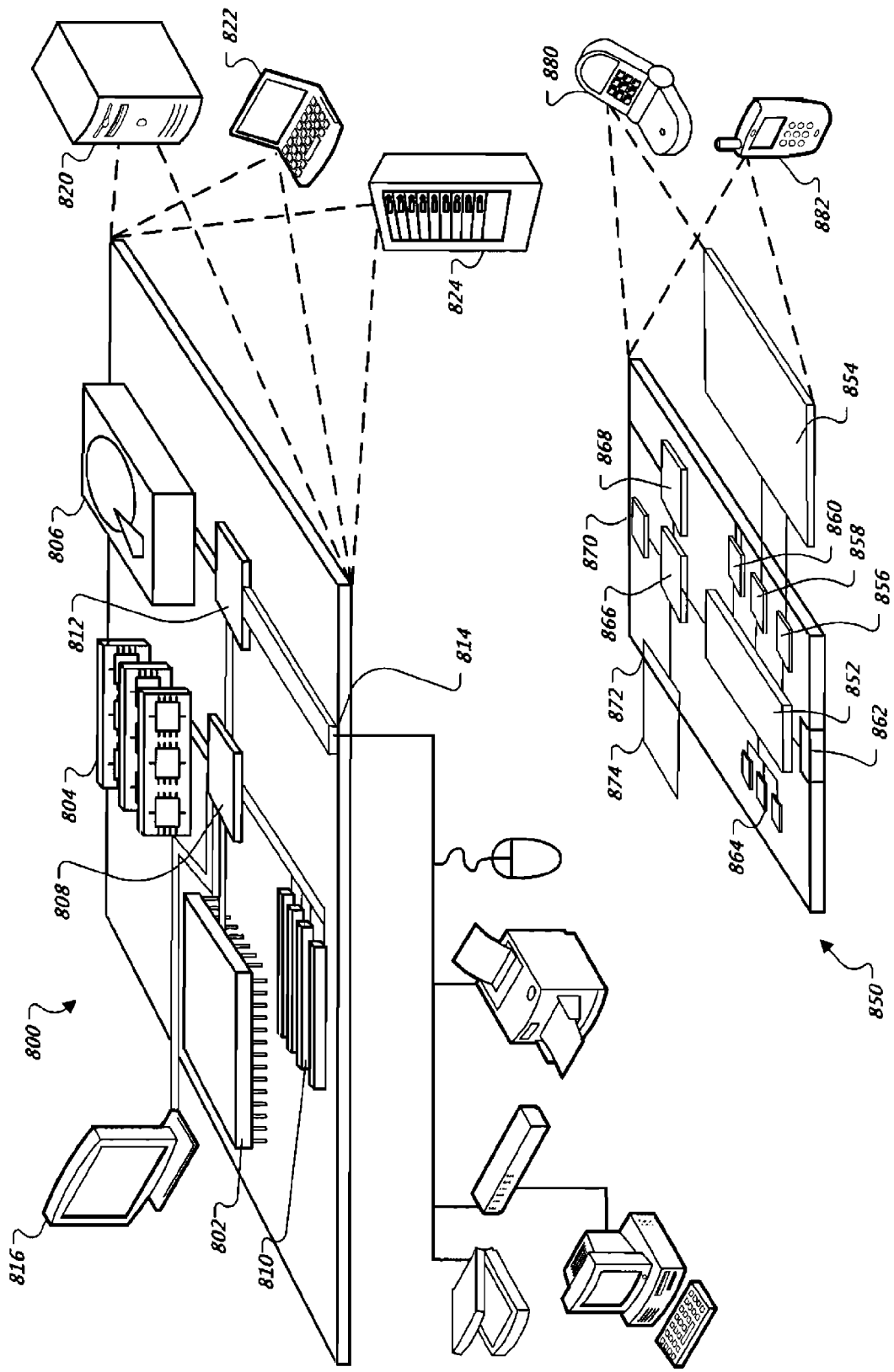
FIG. 8 is a diagram of an exemplary generic computer device and an exemplary generic mobile computer device.

FIG. 8 shows an example of a generic computer device 800 and a generic mobile computer device 850 that may be used to implement the systems and methods described in this document, as either a client or as a server or plurality of servers. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the systems, methods, devices or techniques described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a computer-readable medium. In one implementation, the memory 804 is a volatile memory unit or units. In another implementation, the memory 804 is a non-volatile memory unit or units.

The storage device 806 is capable of providing mass storage for the computing device 800. In one implementation, the storage device 806 is a computer-readable medium. In various different implementations, the storage device 806 may be a floppy disk device, a hard disk device, an optical disk device, a tape device, a flash memory or other similar solid-state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 804, the storage device 806, memory on processor 802, or a propagated signal.

The high speed controller 808 manages bandwidth-intensive operations for the computing device 800, while the low speed controller 812 manages lower-bandwidth-intensive operations. Such allocation of duties is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 852, 864, 854, 866, and 868, are interconnected using various buses, and several of the components may be mounted on a common motherboard or in other manners as appropriate.

The processor 852 can process instructions for execution within the computing device 850, including instructions stored in the memory 864. The processor may also include separate analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to the display 854. The display 854 may be, for example, a TFT LCD display or an OLED display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near-area communication of device 850 with other devices. External interface 862 may provide, for example, for wired communication (e.g., via a docking procedure) or for wireless communication (e.g., via Bluetooth or other such technologies).

The memory 864 stores information within the computing device 850. In one implementation, the memory 864 is a computer-readable medium. In one implementation, the memory 864 is a volatile memory unit or units. In another implementation, the memory 864 is a non-volatile memory unit or units. Expansion memory 874 may also be provided and connected to device 850 through expansion interface 872, which may include, for example, a SIMM card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, memory on processor 852, or a propagated signal.

Device 850 may communicate wirelessly through communication interface 866, which may include digital signal processing circuitry as appropriate. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS receiver module 870 may provide additional wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back-end component (e.g., a data server), or that includes a middleware component (e.g., an application server), or that includes a front-end component (e.g., a client computer having a graphical user interface or a web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the systems, devices, methods and techniques described here. For example, various forms of the flows shown above may be used, with steps re-ordered, added, or removed. Accordingly, other implementations are within the scope of the following claims.

What is claimed is:

1. A computer-implemented review method, the method comprising:
storing information about a plurality of ratable entities;
receiving a machine-readable representation that encodes an identification code associated with a ratable entity of the plurality of ratable entities;
decoding the machine-readable representation to obtain the identification code and retrieve the information;
creating a ratings form based on the identification code and the information, the ratings form being used for providing a review of the ratable entity; and
providing the review of the ratable entity to a central computer system using the review form.

2. The computer-implemented method of claim 1, wherein the ratable entity is a product or service.

3. The computer-implemented method of claim 1, wherein decoding the machine-readable representation comprises capturing an image of the machine-readable representation with a digital camera coupled to a computing device performing the decoding and determining the identification code from the image of the machine-readable representation.

4. The computer-implemented method of claim 1, wherein the machine-readable representation is a linear bar code or two-dimensional bar code.

5. The computer-implemented method of claim 4, wherein the linear bar code is selected from a group of linear bar codes including UPC symbols, EAN-13 codes, and pharmacodes.

6. The computer-implemented method of claim 4, wherein the two-dimensional bar code is selected from a group of two-dimensional bar codes including DataMatrix, QRCode, and PDF417 codes.

7. The computer-implemented method of claim 1, further comprising:

receiving content from the central computer system in response to providing the review of the ratable entity; and
displaying the content.

8. The computer-implemented method of claim 7, wherein the content comprises a coupon received via electronic transmission.

9. The computer-implemented method of claim 7, wherein the content comprises a promotional item for an entity that provides products or services similar to or complementary to those of the ratable entity.

10. The computer-implemented method of claim 7, further comprising transmitting an electronic message to a receiving device of the ratable entity, the electronic message comprising the content.

11. The computer-implemented method of claim 7, further comprising:
receiving user input corresponding to the content, the content comprising a uniform resource locator (URL);
transmitting a request based on the URL; and
receiving a response based on the request, the response comprising at least one of a coupon and a message.

12. The computer-implemented method of claim 7, wherein the content comprises an invitation to view a web page including information related to the review.

13. The computer-implemented method of claim 7, wherein the content is embedded in an email.

14. The computer-implemented method of claim 1, wherein providing the review of the ratable entity comprises receiving user input ranking the ratable entity into the ratings form.

15. The computer-implemented method of claim 1, wherein the review comprises multimedia content including audio recordings, pictures, photographs, video recordings, or any combination thereof.

16. The computer-implemented method of claim 1, wherein the method is performed by a mobile computing device.

17. The computer-implemented method of claim 1, wherein receiving the machine-readable representation further comprises receiving a scanned image of the machine-readable representation.

18. A non-transitory computer readable medium tangibly embodied and stored in an information carrier and comprising instructions that when executed by a processor perform a method, the method comprising:
storing information about a plurality of ratable entities;
receiving a machine-readable representation that encodes an identification code associated with a ratable entity of the plurality of ratable entities;
decoding the machine-readable representation to obtain the identification code and retrieve the information;
creating a ratings form based on the identification code and the information, the ratings form being used for providing a review of the ratable entity; and
providing the review of the ratable entity to a central computer system using the review form.

19. The non-transitory computer readable medium of claim 13, wherein decoding the machine-readable representation comprises capturing an image of the machine-readable representation with a digital camera coupled to a computing device performing the decoding and determining the identification code from the image of the machine-readable representation.

20. The non-transitory computer readable medium of claim 18, wherein the machine-readable representation is a linear bar code or two-dimensional bar code.

21. The non-transitory computer readable medium of claim 18, further comprising instructions that when executed by the processor receive content from the central computer system after providing the review of the ratable entity.

22. The non-transitory computer readable medium of claim 18, wherein providing a review of the ratable entity comprises receiving user input ranking the ratable entity into the ratings form.

23. A computer-implemented review device, comprising:
   a database storing information about a plurality of ratable entities;
   an input module to receive a machine-readable representation that encodes an identification code associated with a ratable entity; and
   a code generator to provide the identification code associated with the ratable entity,
   wherein the device creates an electronic ratings form that includes one or more ratings categories in response to providing the identification code and based on the information; and wherein the device is operable to electronically transmit a review of the ratable entity to a central computer through completion of the form.

24. A mobile device, comprising:
   a database storing information about a plurality of ratable entities;
   an input module to receive a machine-readable representation that encodes an identification code associated with a ratable entity;
   a code generator to provide the identification code associated with a ratable entity;
   means for associating the received identification code with one or more ratings categories and creating an electronic ratings form that includes the one or more ratings categories, wherein creating is performed using both the identification code and the information; and
   wherein the mobile device is operable to electronically transmit a review of the ratable entity to a central computer through completion of the form.

25. A computer-implemented method, the method comprising:
   storing information about a plurality of ratable entities;
   receiving a machine-readable representation that encodes an identification code;
   associating a ratable entity of the plurality of ratable entities with the identification code;
   creating a ratings form for rating the ratable entity based on the identification code and the information in response to associating the ratable entity with the identification code;
   transmitting, by electronic communication, a review of the ratable entity to a central computer system, the review comprising one or more ratings of the ratable entity.

26. The computer-implemented method of claim 25, wherein the machine-readable representation is a linear bar code or a two dimensional bar code.

27. The computer-implemented method of claim 25, further comprising:
   receiving electronic content after transmitting the review of the ratable entity; and
   displaying the content.

28. The computer-implemented method of claim 27, wherein the electric content is a coupon.

29. The computer-implemented method of claim 27, wherein the electric content is an advertisement.

* * * * *

UNITED STATES PATENT AND TRADEMARK OFFICE
CERTIFICATE OF CORRECTION

| | | |
|---|---|---|
| PATENT NO. | : 8,844,800 B2 | Page 1 of 1 |
| APPLICATION NO. | : 12/060188 | |
| DATED | : September 30, 2014 | |
| INVENTOR(S) | : Sahuguet | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 492 days.

Signed and Sealed this
Eighth Day of September, 2015

Michelle K. Lee
*Director of the United States Patent and Trademark Office*